Aug. 24, 1937.                J. LAAGER                2,090,892
           FEEDING DEVICE FOR FILMS IN CINEMATOGRAPHIC APPARATUS
                  Filed May 12, 1936          2 Sheets—Sheet 1

J. Laager
INVENTOR

By Glascock Downing & Seebold
ATTYS.

Aug. 24, 1937.  J. LAAGER  2,090,892
FEEDING DEVICE FOR FILMS IN CINEMATOGRAPHIC APPARATUS
Filed May 12, 1936   2 Sheets-Sheet 2
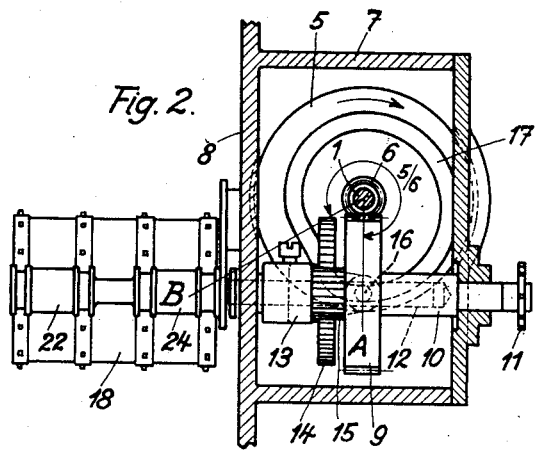
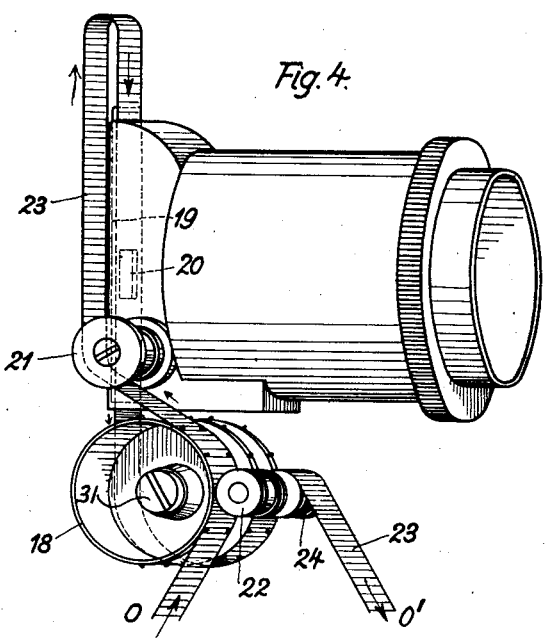
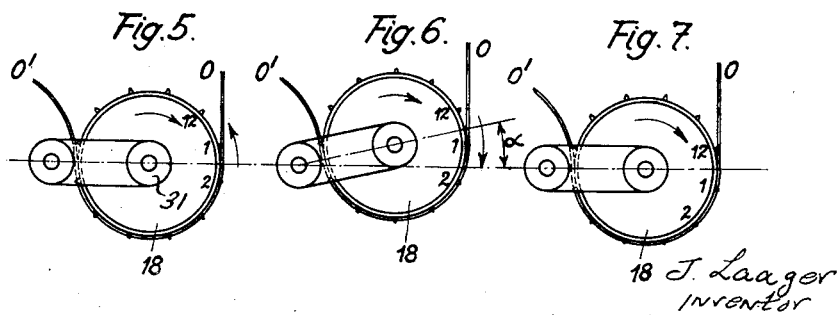
J. Laager
INVENTOR
By Glascock Downing & Seebold
Attys.

Patented Aug. 24, 1937

2,090,892

UNITED STATES PATENT OFFICE 2,090,892

FEEDING DEVICE FOR FILMS IN CINEMATOGRAPHIC APPARATUS

Jean Laager, Pery-Reuchenette, Switzerland

Application May 12, 1936, Serial No. 79,347
In Switzerland May 23, 1935

1 Claim. (Cl. 88—18)

The present invention relates to an intermittent feeding device for films in cinematographic apparatus. It comprises a sprocket feed drum combined with means imparting to this drum not only a continuous rotary movement but also a vertical oscillating movement having a quick downwards stroke which effects the changing of the picture and a slower upwards stroke which neutralizes the effect of rotation of the drum on the film and causes the picture to remain stationary before the projecting aperture.

The usual feeding system of films by means of sprockets though affording a steady projection is very injurious for the film. The introducing of a sprocket into a hole, the rough and sudden pull upon the film and all this working solely on the edge of the hole cause a rapid wear especially in the ultra modern apparatus now on the market which are using a speaking film of 16 millimeters having only one row of holes and a feeding time of the picture of ¼ and even ⅛ of a picture cycle revolution. All these facts cause a rapid wear which must the more be taken into account as the speaking films are rather expensive.

The reason for introducing a feeding time of the picture of only ⅛ of the picture cycle was to lessen the flicker by using three blade shutters.

Though the maltese cross gives better results for films having a width of 35 millimeters and four perforations for each picture it cannot be easily used for narrower films having but one perforation per picture.

In the annexed drawings one working form is shown of the invention, as an example.

Figure 1:
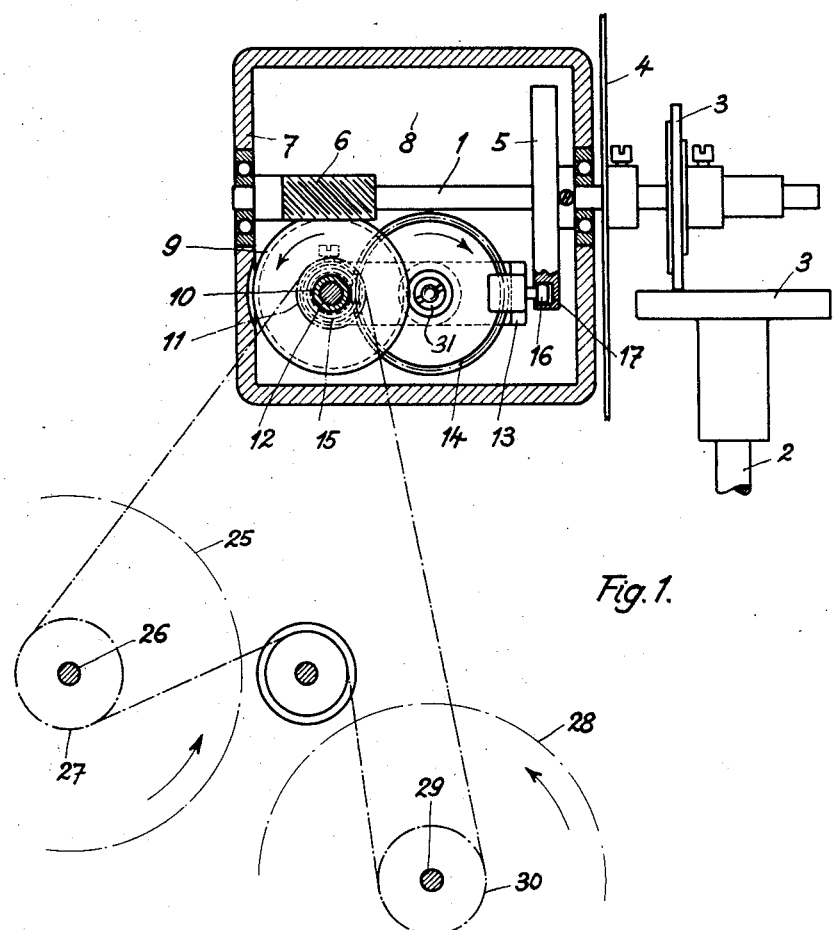
Figure 3:
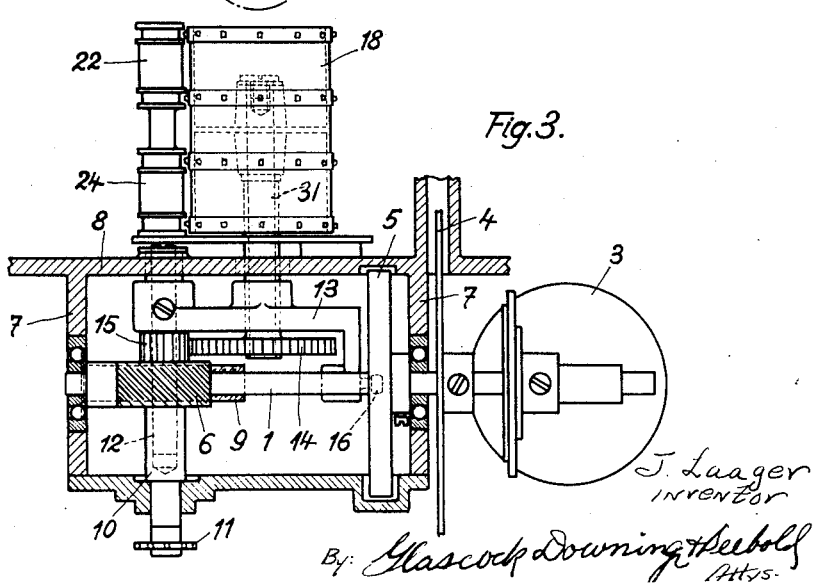

Figs. 1 to 3 are views of the mechanism, Fig. 1 is a side elevation perpendicular to the optical axis, Fig. 2 an elevation parallel to this axis and Fig. 3 a plan view.

Fig. 4 a perspective view of the feed arrangement of the film and

Figs. 5 to 7 show three different positions of the feeding sprocket.

The device shown in the drawings comprises a driving shaft 1 which is parallel to the optical axis of the cinematograph and is driven by a friction gear 3 from the motor shaft 2. Shaft 1 carries a three bladed shutter 4, a grooved cam disk 5 and a worm 6, the portion carrying the cam and the worm being enclosed in a casing 7 which is cast in one piece with a standard 8 of the frame and accommodates bearings of shaft 1. On a pivot pin 12 fast to the casing is pivotally held an arm 13 and is fitted a sleeve 10 integral with a pinion 15 and journaled to the casing 7 on the outside of which it carries a sprocket pinion 11, for a chain drive. Besides sleeve 10 carries next to pinion 15 a worm wheel 9 meshing with the worm 6. The rocking arm 13 is guided at its end in the groove of said cam disk by means of a friction roller 16 and carries at its middle portion a shaft 31 upon which is fast a spur wheel 14 meshing with pinion 15 of the sleeve and a sprocket 18 whereof one half side is intended for the take-in film and the other half side for the pay-out film. This sprocket is carried by a portion of shaft 31 extended to the outside of the standard 8. Likewise on the outside of the standard is held by a bracket the pivot pin of two pressure rollers 22, 24 cooperating with the sprocket and arranged in such a way that the pay-out film enlaces the sprocket on the whole half of its circumference thus bringing a great number of perforations into engagement with the sprocket teeth which greatly attributes to preserving the edges of the perforations of the film. The groove 17 in the cam disk is shaped with a circular portion having a flattening and is adapted to impart to the sprocket, which is nevertheless continuously rotated by the pinion 15, a sudden upwards movement during the image exposure which will cause the sprocket to perform a short backwards rolling on the film and a short stopping of the same in the projection aperture. The sprocket is arranged near the lower end of the gate 19 provided with the projection aperture 20. A guiding roller 21 disposed above the sprocket assures together with a pressure roller 22 in contact with the sprocket the good contact between sprocket and film 23 which is introduced into the gate.

The film delivered from the gate 19 passes from underneath to a lengthened portion of the sprocket 18 and is held in good contact with this sprocket by a roller 24 mounted on the same axis with the roller 22. The film passes then over the roller 24 to the take-up roller 25 which is mounted on a shaft 26 journalled in the standard and carrying on the other side of this standard a chain pinion 27 moved by the sprocket pinion 11. The film supply roller 28 is mounted to a shaft 29 which crosses the standard 8 and carries on the other side of this standard a chain pinion 30 actuated by the chain drive of the film.

The operation of the feeding device is as follows:

When the device is working, the shaft 1 turns as indicated by the arrow in Fig. 2 and drives by means of the worm 6, the wheels 9 and pinion 15 and the wheel 14 with the sprocket drum 18 which during its rotation is submitted to an oscillating movement corresponding to the form of groove 17 in the cam disk 5 which oscillates the arm 13 supporting said wheel 14. This movement results in a back rolling of the drum on the film and provokes at a given moment a rapid sinking of the arm 13 into its lowest position. During this sinking when the roller 16 has passed the right hand portion of the groove and has reached the radius A of the disk (Fig. 2), the former picture will be withdrawn from the aperture 20 and replaced by a new one. The roller 16 travels now on the curved position of the groove and causes the arm 13 to rise. During this passage in order to maintain the film stationary before the aperture, the sprocket 18 continuing turning will travel upwards on the film until the roller is again at the beginning of the straight portion of the groove where the withdrawal of the picture takes place. During this sudden downward movement of the sprocket the film is wrapped round nearly half its circumference and will therefore be engaged by a great number of teeth quite differently from the film contact in well known apparatus where the film is never engaged by more than one or two teeth.

The movement of the sprocket is more exactly as follows:

We suppose that the roller 16 is at the part of the groove 17 which corresponds to the radius A in the Fig. 2, that is corresponding to the lowest position of the sprocket shown in Fig. 5, where the axis of the sprocket has arrived at the lowest point of its swinging movement. The cam is designed so as to turn in the direction of the arrow in Fig. 2 through an angle of 5/6 of the whole circumference that is 300° from radius A to radius B corresponding to the uppermost position of the sprocket, the wheel 14 will be turned through an angle depending on the ratio of the gearing. The ratio is such that if the circumference of the sprocket has a length equal to twelve pictures the angle is 25°. During this 5/6 turn the groove 17 of the cam displaces the arm 13 through an angle α, see Fig. 6 such that during which movement the sprocket rolls backwards on the film without any sliding, and the film remains stationary in the position where the picture is projected. The cam continues turning and travels the last 1/6 turn from B to A. The form of the groove is such, that it causes a rapid sinking of the arm through the angle α, see Fig. 7. The combined movement of this angular displacing with the consequent rotation of the wheel 14 upon the pinion 15 effects a sudden advancing of the film by the height of a picture. The same movements will be repeated at each turn of the shaft 1.

The mechanism as represented is incontestably that which gives the best results for preserving the film. Only continuous feed mechanism could give somewhat better results.

This device is a synthesis of the different systems in use. Indeed it comprises a maltese cross but having a continuous and not a jerking movement. It works on the film by pressure and takes it along by adhesion. The adjusting of the film is more exact than that by means of sprockets alone and the film is engaged by a plurality of teeth.

What I claim is:

In an intermittent feeding device in cinematograph apparatus and in combination, a motor shaft, a driving shaft and a friction gear as driving means between the two, a worm formed on said driving shaft and a shutter and a grooved cam disk fast thereto, a pivot pin fast to the frame, a sleeve fitted on the pin and a worm wheel fast to the sleeve and meshing with said worm, a pinion integral with this worm wheel and a rocking arm pivotally held on said pivot pin and having a roller at its end guided by said grooved cam disk, a journalled shaft carried by said arm, a spur wheel meshing with said pinion and mounted on said journalled shaft and a sprocket, one half side of which being enlaced by the intake film formed into a loop and the other half side enlaced by the pay out film, the shape of the groove in the cam disk being such that while the rotating movement of the sprocket remains continuous this latter receives at each turn a sudden upwards movement to produce the stoppage of the exposed picture by a backwards rolling on the film, two pressure rollers mounted upon the standard, one roller to press the take in film against the sprocket and the other arranged so as to have the whole half circumference of said half sprocket side enlaced by the pay-out film, a sprocket pinion provided at the end of said sleeve, a roller for the pay-out film, a roller for the take-up film and a chain drive adapted to transmit motion from said sprocket pinion to the two film rollers.

JEAN LAAGER.